United States Patent [19]

Saleh

[11] Patent Number: 4,723,321
[45] Date of Patent: Feb. 2, 1988

[54] TECHNIQUES FOR CROSS-POLARIZATION CANCELLATION IN A SPACE DIVERSITY RADIO SYSTEM

[75] Inventor: Adel A. M. Saleh, Holmdel, N.J.

[73] Assignee: American Telephone and Telegraph Company, AT&T Bell Laboratories, Murray Hill, N.J.

[21] Appl. No.: 928,186

[22] Filed: Nov. 7, 1986

[51] Int. Cl.$^4$ .............................................. H04B 1/10
[52] U.S. Cl. ..................................... 455/295; 455/60; 455/137; 455/303; 455/305; 342/361
[58] Field of Search ............... 455/137, 273, 278, 303, 455/305, 295, 60; 370/6, 20; 342/361; 375/39, 102

[56] References Cited

U.S. PATENT DOCUMENTS

| | | | |
|---|---|---|---|
| 4,090,137 | 5/1978 | Soma et al. | 370/20 |
| 4,283,795 | 8/1981 | Steinberger | 455/283 |
| 4,292,685 | 9/1981 | Lee | 370/6 |
| 4,512,034 | 4/1985 | Greenstein et al. | 455/139 |
| 4,577,330 | 3/1986 | Kavehrad | 375/15 |
| 4,606,054 | 8/1986 | Amitay et al. | 375/102 |
| 4,631,734 | 12/1986 | Foschini | 455/295 |

OTHER PUBLICATIONS

Evans, Globecom '82, Miami, Fla., 1982, vol. 2, pp. D3.2.1–D.3.2.4.
Sakagami et al., Rev. Elec. Comm. Labs., vol. 30, No. 5, 1982, pp. 907–919.
Barber, IEEE Trans. Comm., vol. Com–32, No. 1, Jan. 1984, pp. 87–91.
Liniger, Globecom '84, Atlanta, Ga., Nov. 1984, vol. 3, pp. 45.7.1–45.7.5.
Greenstein et al., AT&T Tech. Jrnl., vol. 64, No. 4, Apr. 1985, pp. 907–935.

*Primary Examiner*—Robert L. Griffin
*Assistant Examiner*—Elissa Seidenglanz
*Attorney, Agent, or Firm*—Erwin W. Pfeifle

[57] ABSTRACT

The present invention relates to a technique for achieving cross-polarization interference (CPI) cancellation with or without equalization in a digital-radio, space-diversity communication system. More particularly, a present receiver includes a pair of spaced-apart diversity antennas, where each antenna is capable of receiving orthogonally polarized signals, e.g., Vertical and Horizontal polarizations, from a remote transmitter. The received orthogonally polarized signals from each antenna are separated and coupled to separate inputs of a separate cross-polarization canceler, where each canceler includes two straight-through and two cross-over paths including a separate complex gain multiplier disposed in each path. The correspondingly orthogonally polarized output signals from each of the cancelers are added to produce a first and a second orthogonally polarized overall canceler arrangement output signal. Power measurements are taken of the two overall output signals during predetermined periods of time to produce control signals in a Control and Dither means for appropriately adjusting the complex gain multipliers in each canceler and substantially cancel CPI while providing equalization where desired. Additionally, control signals can also be generated for transmission back to the remote transmitter for appropriately adjusting a canceler therein when CPI cancellation including a second order in frequency is desired.

8 Claims, 7 Drawing Figures

FIG. 7

| STRUCTURE \ CONTROL | MAXIMIZE BASEBAND SIGNAL/(CPI+ISI+NOISE), WITHOUT POST-CANCELER EQUALIZATION | MAXIMIZE IF SIGNAL/(CPI+NOISE), WITH POST-CANCELER EQUALIZATION |
|---|---|---|
| TRANSMITTER CROSS-COUPLING, NO SPACE DIVERSITY RECEPTION | 4-QAM | 16-QAM |
| SPACE DIVERSITY RECEPTION, NO TRANSMITTER CROSS-COUPLING | 16-QAM | 64-QAM |
| SPACE DIVERSITY RECEPTION AND TRANSMITTER CROSS-COUPLING | 64-QAM | 256-QAM |

TECHNIQUES FOR CROSS-POLARIZATION CANCELLATION IN A SPACE DIVERSITY RADIO SYSTEM

TECHNICAL FIELD

The present invention relates to a technique which effects cancellation of cross-polarization interference, with or without equalization, in a space diversity radio system.

DESCRIPTION OF THE PRIOR ART

The use of dual-polarization digital radio in microwave common carrier bands has been increasing to improve transmission efficiency. The major technical problems associated with dual-polarization operation in radio systems is (a) cross-polarization coupling occurs in both the radio equipment and the propagation medium; (b) the associated cross-polarization transfer functions are both dispersive (frequency-selective) and time varying; and (c) the crosspolarization transfer functions produce co-channel interference levels that can be too large for effective detection of QAM signals, e.g., 16-QAM, 64-QAM, or 256-QAM, particularly when the desired co-polarization signal fades due to multipath.

In recent years, many articles and patents have dealt with crosspolarization cancellation techniques, measurements over dual-polarization radio channels, and dual-polarization radio link analysis. In this regard see, for example, U.S. Pat. Nos. 4,283,795 issued to M. L. Steinberger on Aug. 11, 1981, and 4,577,330 issued to M. Kavehrad on Mar. 18, 1986; and the articles "Cofrequency Cross-Polarized Operation of a 91 Mbit/s Digital Radio" by S. Barber in *IEEE Transactions on Communications*, Vol. COM-32, No. 1, January 1984, at pages 87–91, and "Sweep Measurements Of Multipath Effects On Cross-Polarized RF-Channels Including Space Diversity" by M. Liniger in Globecom '84, Vol. 3, Atlanta, Ga., November 1984, at pages 45.7.1–45.7.5.

The trend has also been to meet increased traffic demands by modifying existing single-polarization radio systems by adding dual-polarization to double the capacity on the same frequency band. The problem remaining in the prior art is to provide a simple way of eliminating cross-polarization interference when adding a second polarization to a channel in a radio system where space diversity antennas are used.

SUMMARY OF THE INVENTION

The foregoing problem in the prior art has been solved in accordance with the present invention which relates to a technique for providing crosspolarization interference (CPI) cancellation, and the ability to also provide equalization, in a space diversity radio system. More particularly, a separate simple cross-polarization canceler, which, by itself, cannot be effective in eliminating CPI, is associated with each antenna of a pair of space diversity antennas, where each antenna receives the first and second polarized signals from a remote transmitter. Each canceler receives the first and second polarized signals from the associated antenna at separate first and second inputs, respectively. Each canceler includes two straight-through and two cross-over paths, where each path includes a separate complex gain multiplier means which (a) is frequency independent and, hence, simple to build, and (b) selectively adjusts the gain and phase of a signal propagating in that path in response to receive control signals. The adjusted converging straight-through and cross-over path signals in each canceler are added to provide a separate polarized output signal with reduced CPI at each output of the canceler. The correspondingly polarized output signals from each canceler are then added, and power measurements made of each canceler output signal during predetermined periods of time. The resultant power measurements are used to generate control signals which appropriately adjust the complex gain multiplier means and provide a flat gain output signal with substantially no cross-polarization components.

Other and further aspects of the present invention will become apparent during the course of the following description and by reference to the accompanying drawings.

BRIEF DESCRIPTION OF THE DRAWING

Referring now to the drawings in which like numerals represent like parts in the several views:

FIG. 7 is a Table showing the possible type of Quadrature Amplitude Modulation supported by different approaches of control versus structure.

DETAILED DESCRIPTION

Figure 1:
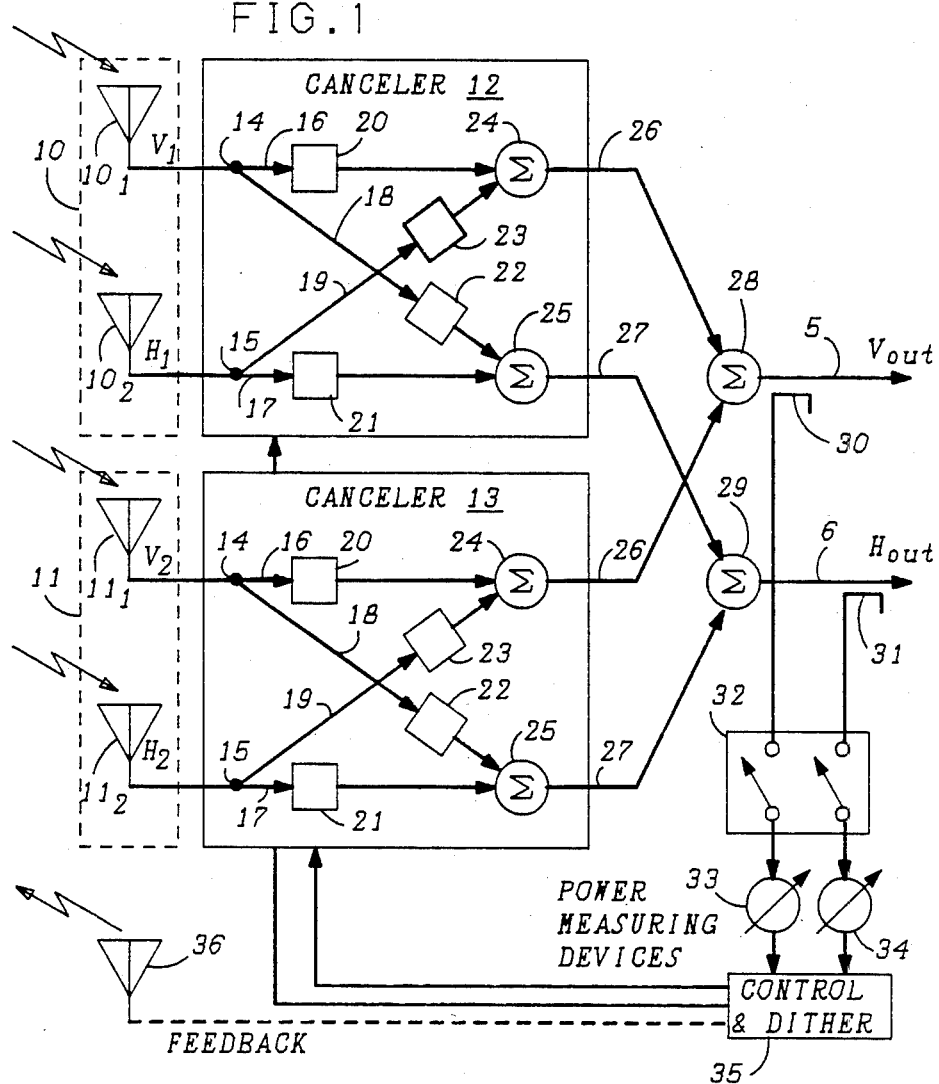
FIG. 1 is a block diagram of an arrangement for providing crosspolarization interference (CPI) cancellation in a space diversity environment in accordance with the present invention.

The present invention relates to method and apparatus for use with dually-polarized transmission signals in radio communication systems using space diversity antennas to substantially cancel cross-polarization interference (CPI) and also provide equalization where desired. More particularly, the present invention exploits the relatively mild dispersion of channel response functions (H-functions) over a digital radio channel bandwidth. In systems using space diversity reception, the mildly dispersive cross-polarization functions are suppressed by using non-dispersive G-functions, i.e., at most one adaptive gain per cross-polarization and cross-coupling branch of each diversity receiver. Probing intervals are used to derive control signals for adjusting the non-dispersive G-functions, and variations on the present invention can also add a degree of multipath equalization.

Over the bandwidth of a microwave radio channel, each channel response function, $H(\omega)$, can be described by a low-order complex polynomial, i.e., $$H_{ij}(\omega) = A_{ij} + j\omega B_{ij} + (j\omega)^2 C_{ij} + \ldots \quad i=1,2; j=1,2 \qquad (1)$$

where (a) the subscript i denotes the destination polarization component and j is the origination polarization component, and (b) all coefficients are complex. For purposes of description hereinafter, it will be assumed that the polarizations used are linear polarizations and that the Vertical polarization will be designated by a 1 while the Horizontal polarization will be designated by a 2 for either of the subscripts i or j. For example, $H_{12}$ designates the cross-polarization response function for Horizontal(2)-into-Vertical(1) and $H_{11}$ designates the inline, or co-polarization, response function for Vertical-into-Vertical. Additionally, the superscripts u and l will be used hereafter to denote the upper and lower space diversity antennas 10 and 11, respectively, shown in the Figures. Thus, in the diagram of FIG. 6, $H_{11}{}^u(\omega)$ i the V-into-V polarization channel response into the upper diversity antenna 10; $H_{22}{}^l(\omega)$ is the H-into-H polarization channel response into the lower diversity antenna 11; etc., where the latter response can be shown expanded, as in equation (1), by $$H_{22}{}^l(\omega) = A_{22}{}^l + j\omega B_{22}{}^l + (j\omega)^2 C_{22}{}^l + \ldots \quad (2)$$

Figure 6:
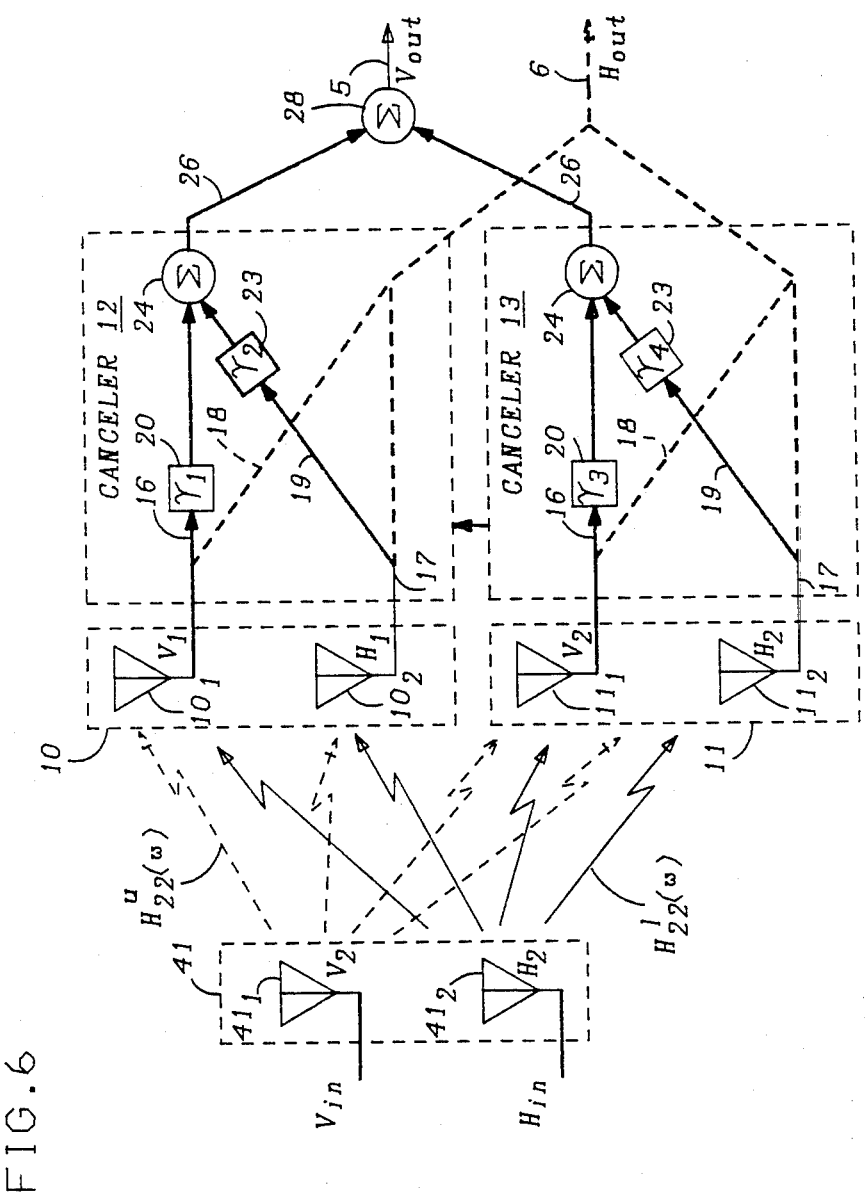
FIG. 6 is a canceler arrangement for the present space diversity technique for explaining how the output signal spectra can be represented by a power series in $j\omega$.

The cross-polarization interference (CPI) spectrum at the output 5 of the V-polarized canceler 12 of FIG. 6 can then be written as $$V_{out}(\omega) = [A_{22} + j\omega B_{22} + (j\omega)^2 C_{22} + \ldots ]V_{in}(\omega) + [A_{12} + j\omega B_{12} + (j\omega)^2 C_{12} + \ldots ]H_{in}(\omega), \quad (3)$$

where $A_{12}$, $B_{12}$ and $C_{12}$ are weighted sums over the complex gains $\gamma_1$, $\gamma_2$, $\gamma_3$ and $\gamma_4$. For example, from equation (1) it can be shown that $$A_{12} = A_{12}{}^u \gamma_1 + A_{22}{}^u \gamma_2 + A_{12}{}^l \gamma_3 + A_{22}{}^l \gamma_4. \quad (4)$$

From the above description, it can be seen that $A_{12}$, $B_{12}$ and $C_{12}$ can all be set to zero by appropriate choices of $\gamma_2/\gamma_1$, $\gamma_3/\gamma_1$, and $\gamma_4/\gamma_1$, with $\gamma_1$ being either fixed (e.g., set at unity) or adjusted to scale the desired cross-polarized signal appropriately.

Figure 2:
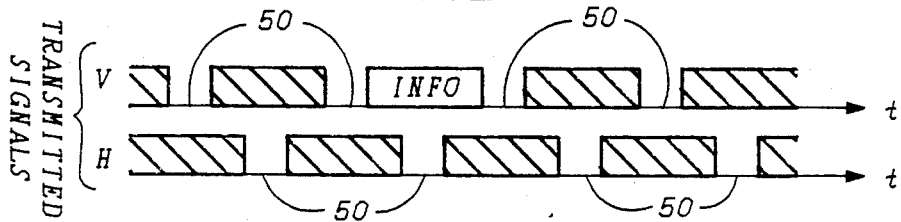
FIG. 2 is a diagram of data stream formats versus time for dual polarization transmissions using alternate quiet probing intervals.

The foregoing discussion discloses the principle of the present technique, and FIGS. 1 and 2 illustrate an exemplary diagram of an arrangement and the format of the transmitted signals, respectively, for practicing the present technique. In FIG. 1, a first and second diversity antenna 10 and 11 are each shown as comprising two separate antennas, one, e.g., antennas $10_1$ and $11_1$, for receiving the Vertically (V) polarized signal components, and another, e.g., $10_2$ and $11_2$, for receiving the Horizontally (H) polarized components of the received signal. It is to be understood that such illustration is provided solely for purposes of explanation and not for purposes of limitation since the normal approach would be to use a separate single antenna 10 and 11, with the V and H polarized components from the received signal from each antenna being separated and directed along separate electrical or waveguide paths by any suitable means. The received V and H signal components at each antenna are understood to include the originally transmitted V and H signals, respectively, plus any cross-polarized signal components occurring during transmission and reception.

The separated V and H output signal components from antenna 10 are received at separate input terminals 14 and 15, respectively, of canceler 12, while the separated V and H output signal components from antenna 11 are received at separate input terminals 14 and 15, respectively, of canceler 13. Each canceler, e.g., canceler 12, propagates the received V and H signal components via a separate straight-through path 16 and 17, respectively, and a respective separate cross-over path 18 and 19. Disposed in each of paths 16 to 19 is a separate adjustable complex multiplier 20 to 23, respectively, to provide simple appropriate selective gain and phase shift adjustments for CPI cancellation of the $V_{out}$ lead 5 and $H_{out}$ lead 6 of the canceler arrangement of FIG. 1. Complex multipliers 20–23 can comprise any suitable device known in the art as, for example, the series CPM complex phase modulators from Olektron Corp., in Webster, Mass. In each of cancelers 12 and 13, the complex multiplier adjusted signals in paths 16 and 19 are added in an adder 24 to produce a resultant adjusted Vertically polarized output signal on lead 26. Similarly, in each of cancelers 12 and 13, the complex multiplier adjusted signals in paths 17 and 18 are added in an adder 25 to produce a resultant adjusted Horizontally polarized output signal on lead 27. The vertically polarized signals on leads 26 from cancelers 12 and 13 are added in an adder 28 to produce the $V_{out}$ signal from the present CPI cancellation arrangement on output lead 5. The horizontally polarized signals on leads 27 from canceler 12 and 13 are also added in an adder 29 to produce the $H_{out}$ signal from the present CPI cancellation arrangement on output lead 6.

In accordance with one embodiment of the prevent invention, the $V_{out}$ and $H_{out}$ signals on output leads 5 and 6, respectively, are partially coupled out via respective couplers 30 and 31 and are propagated via a switching means 32 to power measuring devices 33 and 34, respectively. The power measured by each of devices 33 and 34 during a particular time interval when switching means 32 is closed is converted into a corresponding signal which is transmitted to a control and dither means 35. The control and dither means 35 functions to convert the input power measurement signals into appropriate control signals for transmission to the complex multipliers 20–23 of cancelers 12 and 13, and optionally back to a remote transmitter via antenna 36 to provide further CPI cancellation as will be explained hereinafter with regard to the arrangement of FIG. 3.

The problem solved in accordance with the arrangement of FIG. 1 is that if only one of cancelers 12 or 13 is used, e.g., canceler 12, then such canceler can only cancel CPI if the H and V channels are flat, or are not changing, with frequency. In other words the amplitude of the received signal would have to be substantially flat over a predetermined frequency bandwidth. Such canceler 12 would not work well in a digital radio system where the channels change in frequency. Therefore, in accordance with the present invention, space diversity antennas 10 and 11 and a second canceler 13 are used to achieve cancellation of the flat part of the cross-polarization. $A_{12}$, and the first order of the frequency, $j\omega B_{12}$, as represented by the first and second terms, respectively, in the second half of equation (3).

Figure 3:
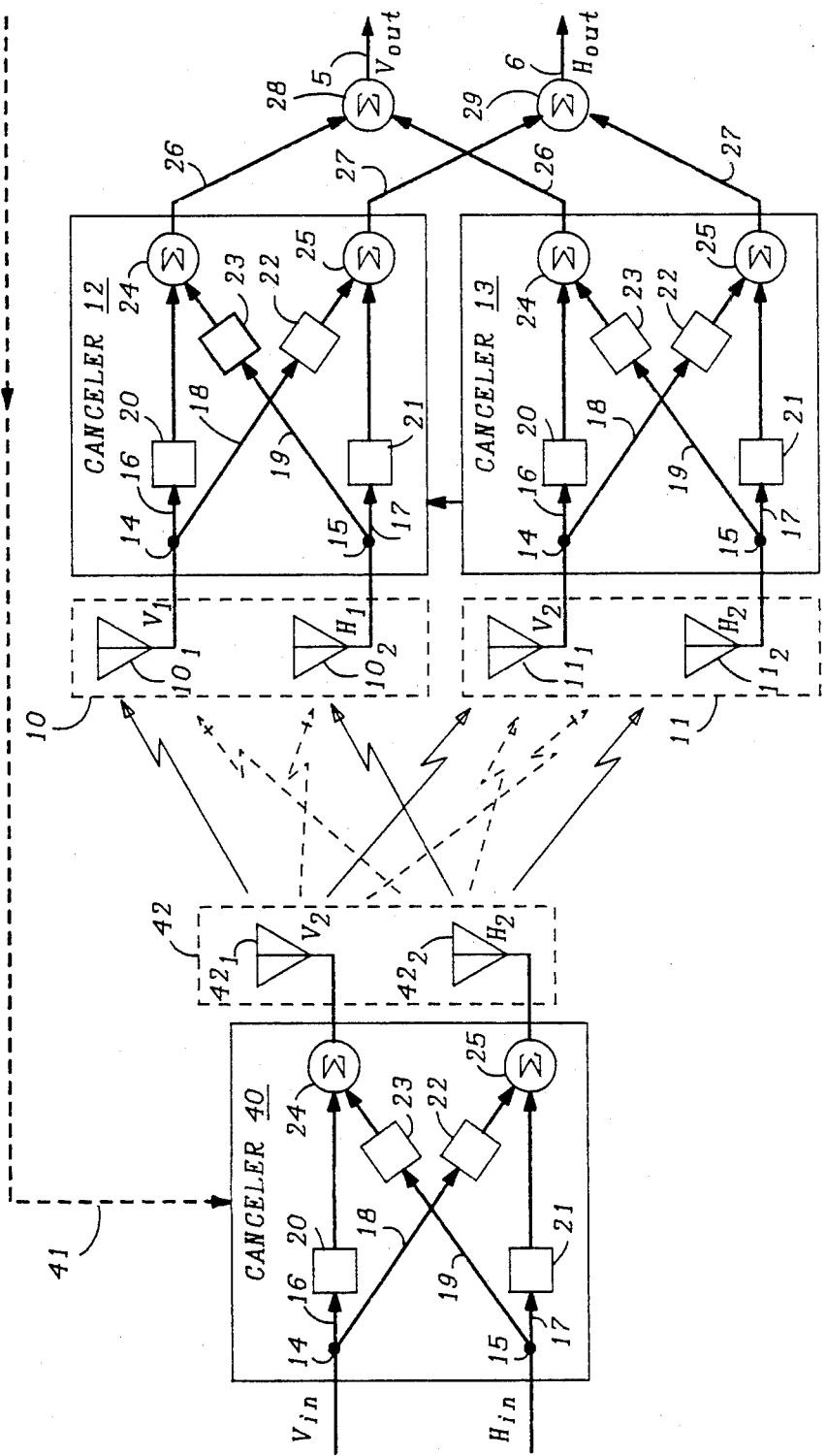
FIG. 3 is a block diagram of the present CPI cancellation technique using feedback to the transmitter for enhancing the cancellation technique of FIG. 1.

To cancel the second order of the frequency, $(j\omega)^2 C_{12}$, shown by the third term in the second half of equation (3), a canceler 40 is required to be disposed at the remote transmitter as shown in FIG. 3, plus the feedback path 41 provided by antenna 36 in FIG. 1. Canceler 40 includes the same elements 14-25, and the functioning thereof, as explained for the corresponding elements of canceler 12 or 13. The output from canceler 40 at the remote transmitter is transmitted by an antenna 42 which comprises section $42_l$, for transmitting the vertically polarized signals, and section $42_2$, for transmitting the horizontally polarized signals. The V and H polarized signals delivered to antenna 42 have been appropriately adjusted by canceler 40 in response to feedback signals from control and dither means 35 at the receiver to cancel the second order of the frequency at the outputs 5 and 6 of the receiver canceler arrangement.

Implementations of first and second embodiments of the present Space Diversity CPI technique are disclosed in FIGS. 1 and 2 and FIGS. 4 and 5, respectively. As shown in FIG. 2 for a first embodiment, the data streams for the Vertically and Horizontally polarized signals use quiet probing intervals 50 which alternate between the Vertically polarized and Horizontally polarized transmissions. At the Vertical polarization output lead 5 in FIG. 1, the $V_{out}$ signal from the canceler arrangement of FIG. 1 will contain only Horizontally polarized interference components during the Vertical polarized quiet probing intervals, and similarly the $H_{out}$ signal from the canceler arrangement on lead 6 will only contain Vertically polarized interference components during the Horizontal polarized quiet probing signals. Therefore, in two successive probing intervals 50, in alternating polarizations, average power measurements can be made on the Horizontal polarization interference signal, to be designated X, and the desired Vertically polarized signal, to be designated S, by power measuring device 33.

Each of power measuring devices 33 and 34 operates in synchronism with each probing interval 50 in the $V_{out}$ and $H_{out}$ data streams because switching means 32 is synchronized to close during such quiet probing intervals. Control and Dither means 35 computes the ratio S/X and generates appropriate control signals to drive the gain in complex multipliers 20 and 23 in cancelers 12 and 13 to maximize this ratio. Techniques for dither control of circuit gains are well known in the art and any suitable technique can be used. Power measuring device 34 operates similar to that explained for power measuring device 33 in order to control the gain of complex multipliers 21 and 22 in cancelers 12 and 13 and maximize the ratio for $H_{out}$ on output lead 6.

The feedback path to antenna 36 in FIG. 1 can be used to facilitate and added degree of CPI control via adaptive cross-coupling in canceler 40 in the transmitter should in FIG. 3. Thus, if a small amount of $V_{in}$ at the transmitter is coupled into the Horizontally polarized transmission through complex multiplier 22 in canceler 40, and similarly a small amount of $H_{in}$ is coupled into the Vertically polarized transmission, then by proper control of these two added gains the net CPI responses at the outputs of FIG. 1 could be canceled to include the second order in frequency. More generally, transmitter cross-coupling adds another degree of control freedom to achieve CPI reduction. The control of the variable transmitter gains in canceler 40 can use the same technique as used for the receiver gains in cancelers 12 and 13, except that the control signals have to be communicated back to the transmitter over feedback path 41. It is to be understood that feedback path 41 could comprise a separate radio channel, or existing wire or data link facilities.

Cross Polarization Inteference (CPI) and multipath equalization can also be achieved simultaneously using the basic approach discussed hereinbefore. Instead of canceling the cross-polarization responses to include the first order in frequency, or second order if transmitter cross-coupling is used in canceler 40, the variable gains complex multipliers 20-23 can be adjusted so that the copolarization responses are equalized to a first order in frequency, and the cross-polarization responses are canceled only to the flat response, or to include a first order if transmitter cross-coupling in canceler 40 is used.

Figure 4:
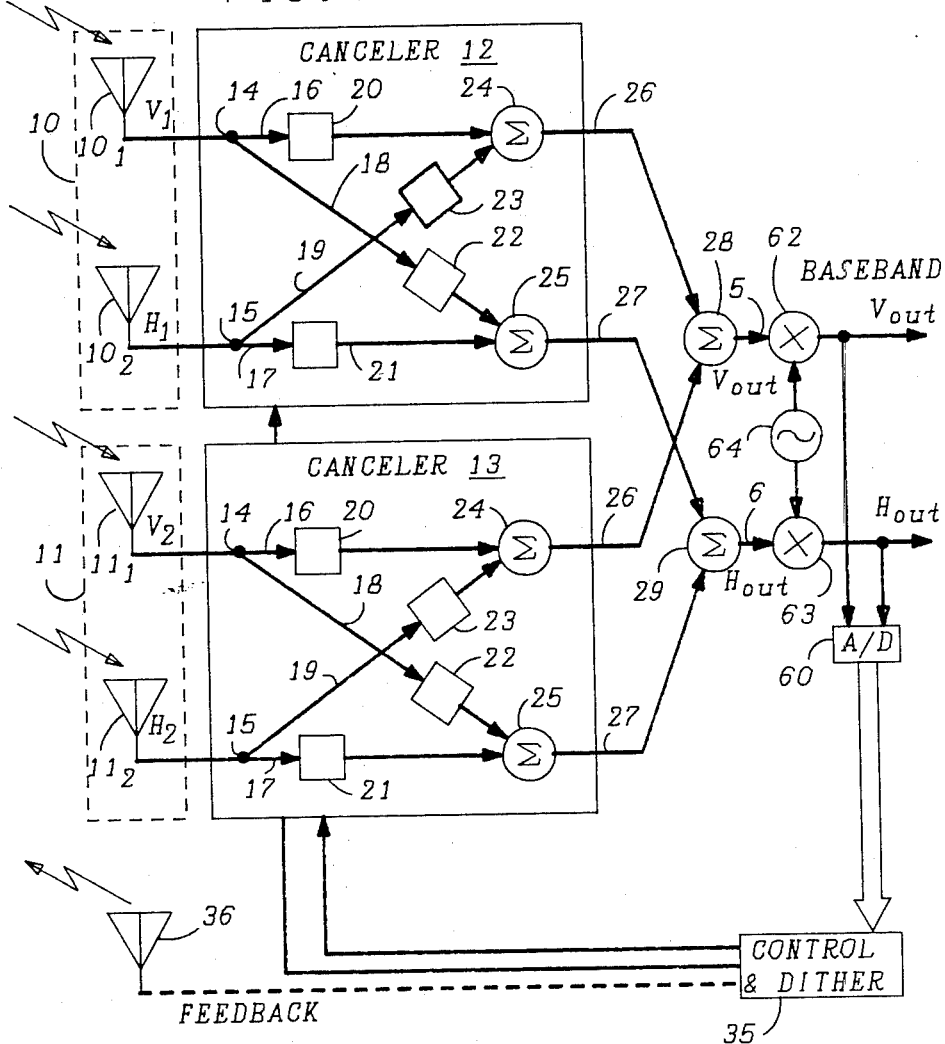
FIG. 4 is a block diagram of a modified arrangement of FIG. 1 for maximizing the signal-to-(CPI+ISI+Noise) ratio at baseband.
Figure 5:
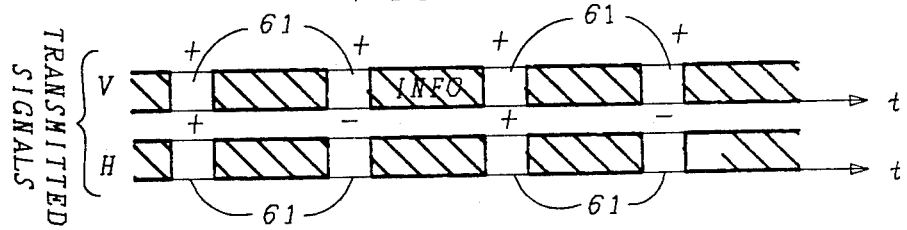
FIG. 5 is a diagram of data stream formats versus time for dual polarization transmissions using concurrent probing intervals which include unique digital signals.

FIGS. 4 and 5 show an arrangement and technique similar to that of FIGS. 1 and 2 for a second embodiment, but with two differences. A first difference is that the input to Control and Dither means 35 are digitized complex baseband samples taken once every frame period by an Analog-to-Digital (A/D) circuit 60. The second difference is that the alternating quiet probing intervals 50 of FIG. 2 are replaced by concurrent non-quiet probing intervals 61 of FIG. 5 including known data sequences in the Vertically and Horizontally polarized signals. With one of the polarizations, e.g., the Vertical polarization, these data sequences are the same and comprise the same polarity from one probing interval to another, and with the other polarization, e.g., the Horizontal polarization, these sequences are the same but alternate in polarity. As shown in FIG. 4, the $V_{out}$ and $H_{out}$ signals from adders 28 and 29. respectively, are first provided as inputs to respective mixers 62 and 63 where they are mixed with the output signal from a local oscillator 64 to provide the respective baseband output signals $V_{out}$ and $H_{out}$ which are then sampled in A/D circuit 60.

The sequence of complex samples taken from the baseband $V_{out}$ signal at the output of mixer 62 during the first probing interval 61 shown in FIG. 5 can be called $\{V+h\}$, where $\{V\}$ is the co-polarized sequence, including intersymbol interference (ISI), and $\{h\}$ us the cross-polarized sequence found in the Vertically polarized signal. This composite sequence is digitized and stored in a memory means of Control and Dither means 35. In the next probing interval 61, the sampled sequence from $V_{out}$ is $\{V-h\}$ because of the polarity inversion used in the Horizontally polarized transmission. A third sequence stored at the receiver in the Control and Dither means 35 is the known probing interval data sequence and designated $\{Y\}$. By summing the first two sequences $\{V+h\}$ and $\{V-h\}$, dividing by 2, and subtracting the third, $\{Y\}$, Control and Dither means 35 obtains an estimate of ISI (ignoring thermal noise for simplicity) defined by:

$$[\{V+h\}+\{V-h\}]/2-\{Y\}=\{V\}-\{Y\}=ISI \qquad (5)$$

In Equation (5), the first term $[\{V+h\}+\{V-h\}]/2$ provides the Cross Polarization Interference residue $\{h\}$. Similar processing of $H_{out}$ during the probing intervals yields the same kind of information in the other polarization. The ISI and CPI sequences thus obtained can be used, via and suitable dither algorithm, by Control and Dither means 35 to adapt the variable gains in the receiver, and transmitter if appropriate.

The criterion for the adaptation is to minimize the mean square sum of CPI and ISI (and thermal noise). Given the locally stored data sequence $\{Y\}$, the control technique automatically scales the gains, all of which must therefore be variable, so that the signal level is fixed. Thus, minimizing the mean square sum of CPI, ISI and noise is equivalent to maximizing the Signal-to-(CPI+ISI+Noise) ratio.

FIG. 7 is a Table summarizing the maximum number of Quadrature Amplitude Modulation (QAM) levels that are expected to be supported using permutations of of the three transmitter/receiver structures listed at the right-hand side versus the two control strategies to (a) maximize the Signal-to-(CPI+ISI+Noise) ratio as in FIG. 4 with no additional equalization, and to maximize the IF Signal-to-(CPI+Noise) ratio as in FIG. 1 and add post-canceler equalization. As a practical matter, the best approach for, for example, 64-QAM is space diversity reception without transmitter cross-coupling, maximization of the IF Signal-to-(CPI+Noise) ratio, and post canceler equalization to provide good performance and simplicity. All other possibilities would be considerably more complicated, with uncertain benefits.

What is claimed is:

1. A cross-polarization interference (CPI) canceler arrangement comprising:

a first cross-polarization canceler (12) for receiving first and second orthogonally polarized signal components received by a first antenna at first and second input terminals, respectively, the canceler comprising (a) first and second straight-through paths and (b) first and second cross-over paths coupled to the first and second input terminals, respectively, each straight-through and cross-over path including means for selectively adjusting complex gain elements of a signal propagating therethrough for providing reduced CPI in desired first and second orthogonally polarized signals at first and second output terminals, respectively, of the canceler;

a second cross-polarization canceler (13) for receiving horizontally and vertically polarized signal components received by a second antenna, which is a diversity antenna of the first antenna, at first and second input terminals, respectively, the second canceler comprising (a) first and second straight-through paths and (b) first and second cross-over paths coupled to the first and second input terminals, respectively, each straight-through and cross-over path including means for selectively adjusting complex gain elements of a signal propagating therethrough for providing reduced CPI in desired first and second orthogonally polarized signals at first and second output terminals, respectively, of the second canceler;

first and second adders (28,29) for adding corresponding first and second orthogonally polarized output signals, respectively, from the first and second cancelers and producing first and second orthogonal polarized output signals from the CPI canceler arrangement; and control means (33-35, 60) for measuring the signal level of each of the CPI canceler arrangement output signals during predetermined periods of time and for generating appropriate control signals to each of the means for selectively adjusting the complex gain elements in the first and second cancelers for maximizing a signal-to-CPI ratio for each CPI canceler arrangement output signal.

2. A cross-polarization interference (CPI) canceler arrangement according to claim 1 wherein the means for selectively adjusting complex gain elements in the first and second cancelers comprise complex gain multipliers.

3. A CPI canceler arrangement according to claim 1 wherein the first and second orthogonally polarized signal components received at each of the first and second input terminals, respectively, of the first and second cancelers include short quiet probing intervals which sequentially alternate between the first and the second input signals; and the control means comprises:

measuring means (32-34) for measuring the signal level of each of the first and second orthogonally polarized output signals from the CPI canceler arrangement during an occurrence of a quiet probing interval in either of one the first and second signals, and generating an output signal representative of such signal levels; and control and dither means (35) responsive to the output signals from the measuring means for generating appropriate control signals to the means for selectively adjusting complex gain elements in each of the first and second cancelers to maximize the signal-to-CPI ratio in each CPI canceler arrangement output signal.

4. A CPI canceler arrangement according to claim 3 wherein control and dither means is further capable of generating control signals for transmission back to a remote transmitter, which transmitted the first and second orthogonally polarized signals received by the CPI canceler arrangement, for controlling means for selectively adjusting complex gain elements in a third canceler disposed at the remote transmitter for further maximizing the signal-to-CPI ratios in the canceler arrangement output signals.

5. A CPI canceler arrangement according to claim 3 wherein the means for selectively adjusting complex gain elements in the first and second cancelers comprise complex gain multipliers.

6. A CPI canceler arrangement according to claim 1 wherein the first and second orthogonally polarized signal components received at each of the first and second input terminals, respectively, of the first and second cancelers comprise concurrent sequential short probing intervals which include (a) a known digital data sequence of a first polarity in the first polarized CPI canceler arrangement output signal and (b) the known digital data sequence which alternates between the first polarity and a second opposing polarity in sequential probing intervals in the second polarized CPI canceler arrangement output signal; and the control means comprises:

analog-to-digital (A/D) sampling means (60) for sampling each of the first and second orthogonally polarized output signals from the CPI canceler arrangement during the occurrence of each probing interval, and generating digital output signals representative of signal level of each sample; and control and dither means (35) responsive to the output signals from the A/D sampling means for generating appropriate control signals to the means for selectively adjusting complex gain elements in each of the first and second cancelers to maximize the signal-to-CPI ratio in each CPI canceler arrangement output signal.

7. A CPI canceler arrangement according to claim 6 wherein the control and dither means is further capable of generating control signals for transmission back to a remote transmitter, which transmitted the first and second orthogonally polarized signals received by the CPI canceler arrangement, for controlling means for selectively adjusting complex gain elements in a third canceler disposed at the remote transmitter for further maximizing the signal-to-CPI ratios in the canceler arrangement output signals.

8. A CPI canceler arrangement according to claim 6 wherein
the means for selectively adjusting complex gain elements in the first and second cancelers comprise complex gain multipliers.

* * * * *